United States Patent
Sahlin

(10) Patent No.: US 8,705,668 B2
(45) Date of Patent: Apr. 22, 2014

(54) CALCULATION OF SOFT VALUES FOR UPLINK COMMUNICATION

(75) Inventor: Henrik Sahlin, Molnlycke (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 106 days.

(21) Appl. No.: 13/497,552

(22) PCT Filed: Sep. 25, 2009

(86) PCT No.: PCT/EP2009/062447
§ 371 (c)(1),
(2), (4) Date: Mar. 22, 2012

(87) PCT Pub. No.: WO2011/035810
PCT Pub. Date: Mar. 31, 2011

(65) Prior Publication Data
US 2012/0177154 A1    Jul. 12, 2012

(51) Int. Cl.
*H03D 1/00* (2006.01)

(52) U.S. Cl.
USPC ........... 375/341; 375/340; 375/316; 375/265; 375/261; 375/260; 375/259; 455/101; 455/132; 455/141

(58) Field of Classification Search
USPC ......... 375/341, 340, 316, 265, 261, 260, 259; 455/101, 132, 141
See application file for complete search history.

(56) References Cited

U.S. PATENT DOCUMENTS

2009/0060079 A1*  3/2009  Choi et al. ............... 375/265

OTHER PUBLICATIONS

Higashinaka, et al., "Likelihood Estimation for Reduced-Complexity ML Detectors in a MIMO Spatial-Multiplexing System", IEICE Trans. Commun., Mar. 3, 2008, vol. E91-B, No. 3, p. 837-847, XP001513806.
Kawai, et al., "Likelihood Function for QRM-MLD Suitable for Soft-Decision Turbo Decoding and Its Performance for OFCDM MIMO Multiplexing in Multipath Fading Channel", IEICE Trans. Commun., Jan. 1, 2005, vol. E88-B, No. 1, p. 47-57, XP003013612.

* cited by examiner

*Primary Examiner* — Zewdu Kassa
(74) *Attorney, Agent, or Firm* — Rothwell, Figg, Ernst & Manbeck, P.C.

(57) ABSTRACT

A node comprising a receiver for i) receiving at least two signals streams comprising bit sequences and ii) evaluating which bit sequence that is most likely to have been received for a certain sent symbol for each signal stream. The receiver for calculating metrics indicative of which bit sequence that initially is most likely to correspond to a certain sent symbol, the metrics being used a soft value calculation where the receiver is arranged for addition of metric data for a certain signal stream corresponding to an added bit sequence for each case where the available metrics are incomplete for performing the estimation. The missing bit is inserted in the added bit sequence and chosen such that it corresponds to a symbol with the shortest Euclidian distance to the symbol with the said corresponding bit sequence initially being indicated as most likely to correspond to a certain sent symbol.

18 Claims, 5 Drawing Sheets

CALCULATION OF SOFT VALUES FOR UPLINK COMMUNICATION

CROSS REFERENCE TO RELATED APPLICATION(S)

This application is a 35 U.S.C. §371 National Phase Entry Application from PCT/EP2009/062447, filed Sep. 25, 2009, designating the United States, the disclosure of which is incorporated herein in its entirety by reference.

TECHNICAL FIELD

The present invention relates to a node in a wireless communication network, the node comprising a receiver arranged for receiving at least two signals streams from at least one user via at least one antenna, the signal streams comprising bit sequences, each received bit sequence constituting one symbol from a set of at least four symbols. The receiver is further arranged for evaluating which bit sequence that is most likely to have been received for a certain sent symbol for each signal stream by means of discarding certain possible bit sequences and keeping certain possible bit sequences, and furthermore, for the remaining possible bit sequences, the receiver is arranged for calculating metrics indicative of which bit sequence that initially is most likely to correspond to a certain sent symbol.

The metrics are used for calculation of an estimation for each received bit, which estimation is indicative of which bit that is most likely to correspond to a certain sent bit. The receiver is arranged for addition of metric data for a certain signal stream corresponding to an added bit sequence for each case where the available metrics are incomplete for performing the estimation since either a bit of the value "1" or a bit of a value "0" is missing for said certain signal stream. The added bit sequence corresponds to the said bit sequence that initially is indicated to be most likely to correspond to a certain sent symbol, where the missing bit is inserted in the added bit sequence in the place where it is missing.

The present invention also relates to a corresponding method.

BACKGROUND

LTE (Long-term evolution) is a project within the 3GPP (3rd Generation Partnership Project) with an aim to improve the UMTS (Universal Mobile Telecommunications System) mobile phone standard for coping with future technology evolutions. The LTE comprises developing a new air interface standard, and the downlink (base station to user equipment) will be based on OFDMA (orthogonal frequency division multiple access). For the uplink (user equipment to base station), SC-FDMA (single carrier frequency division multiple access) is an attractive choice as SC-FDMA has a lower peak-to-average power ratio than OFDM. The lower peak-to-average power ratio entails improved transmitter power efficiency for the battery-operated user equipment, which is an important design consideration.

In any wireless communication system, a transmitted signal is distorted due to dynamic properties of a radio channel through which it is transmitted. In order to compensate for the dynamic properties of the radio channel, different methods are available for combating interference. An ideal compensation would completely cancel the effects of the radio channel and the resulting equalized channel would be completely frequency flat. However, such a scheme would in most cases lead to unwanted noise amplification limiting the performance. Equalization schemes must therefore provide a trade-off between noise amplification and making the equalized channel frequency-flat.

For the transmitted data to be recovered at the receiver it is important that the interference is suppressed. Besides the mentioned power consumption aspect of the user equipment, there is also a desire to restrict the size and costs of the user equipment in order for it to be attractive. The desire to reduce size, cost and power consumption is valid also for receivers in the base station. The space for and costs of processing circuitry should therefore be kept at a minimum. The complexity of the methods used for combating the interference competes with a desire to cancel the interference to as large extent as possible. The designer thus stands before the choice of using interference combating algorithms having less than optimal performance and designing a rather complex and consequently expensive receiver. In short, there is a trade-off between complexity of receiver and performance in terms of accuracy.

A particular example of this trade-off is the choice of decoding scheme to be used in the receiver. An advanced detection scheme is the maximum likelihood detection (MLD), but it has a computational complexity that is exponential with the number of modulation symbols. Efforts have been made to reduce the computational complexity to acceptable levels, an efficient implementation of MLD being, for example, sphere decoding.

In view of the above, it would be desirable to provide simplified and yet effective interference cancellation methods, and in particular a MLD having even further reduced complexity than the hitherto known methods.

SUMMARY

The present invention relates to a node in a wireless communication network, the node comprising a receiver arranged for receiving at least two signals streams from at least one user via at least one antenna, the signal streams comprising bit sequences, each received bit sequence constituting one symbol from a set of at least four symbols. The receiver is further arranged for evaluating which bit sequence that is most likely to have been received for a certain sent symbol for each signal stream by means of discarding certain possible bit sequences and keeping certain possible bit sequences, and furthermore, for the remaining possible bit sequences, the receiver is arranged for calculating metrics indicative of which bit sequence that initially is most likely to correspond to a certain sent symbol. The metrics are used for calculation of an estimation for each received bit, which estimation is indicative of which bit that is most likely to correspond to a certain sent bit. The receiver is arranged for addition of metric data for a certain signal stream corresponding to an added bit sequence for each case where the available metrics are incomplete for performing the estimation since either a bit of the value "1" or a bit of a value "0" is missing for said certain signal stream. The added bit sequence corresponds to the said bit sequence that initially is indicated to be most likely to correspond to a certain sent symbol, where the missing bit is inserted in the added bit sequence in the place where it is missing. The bit sequence comprising the inserted missing bit is further chosen such that it also corresponds to a symbol with the shortest Euclidian distance to the symbol with the said corresponding bit sequence that initially is indicated to be most likely to correspond to a certain sent symbol.

The present invention also relates to a method in a receiver of a node in a wireless communication network, comprising the steps:

receiving at least two signals streams from at least one user via at least one antenna, the signal streams comprising bit sequences, each received bit sequence constituting one symbol from a set of at least four symbols;

evaluating which bit sequence that is most likely to have been received for a certain sent symbol for each signal stream by means of discarding certain possible bit sequences and keeping certain possible bit sequences;

calculating metrics indicative of which bit sequence that is most likely to correspond to a certain sent symbol for the remaining possible bit sequences;

further using the metrics for calculation of an estimation for each received bit, which estimation is indicative of which bit that is most likely to correspond to a certain sent bit;

adding metric data corresponding to an added bit sequence for each case where the available metrics are incomplete for performing the estimation since either a bit of the value "1" or a bit of a value "0" is missing, the added bit sequence corresponding to the said bit sequence that initially is indicated to be most likely to correspond to a certain sent symbol;

inserting the missing bit in the added bit sequence in the place where it is missing; and choosing the bit sequence comprising the inserted missing bit such that it also corresponds to a symbol with the shortest Euclidian distance to the symbol with the said corresponding bit sequence that initially is indicated to be most likely to correspond to a certain sent symbol.

According to an embodiment, the discarding of certain possible bit sequences and keeping of certain possible bit sequences is performed as a tree-search with an M-algorithm.

According to another embodiment, the estimation is in the form of a soft value calculation which either is performed by means of squared Euclidian distances in a max-log LLR, Log Likelihood Ratio, approximation or by means of Euclidian distances in a max-log LLR, Log Likelihood Ratio, approximation.

Thus the soft value calculation is either performed according to:

$$L(b_k(i) \mid \hat{S}_{QR}) = \min_{S \in S_{0,k,i}} \{\|\hat{S}_{QR} - \hat{G}_{QR}S\|^2\} - \min_{S \in S_{1,k,i}} \{\|\hat{S}_{QR} - \hat{G}_{QR}S\|^2\}$$

or $$L(b_k(i) \mid \hat{S}_{QR}) = \min_{S \in S_{0,k,i}} \{\|\hat{S}_{QR} - \hat{G}_{QR}S\|\} - \min_{S \in S_{1,k,i}} \{\|\hat{S}_{QR} - \hat{G}_{QR}S\|\}$$

where $b_k(i)$ is bit number i for user k, and $S_{0,k,i}$ is the set of all possible transmitted symbols for which bit number i is "0" for user k. In the same manner, $S_{1,k,i}$ is the set of all possible transmitted symbols for which bit number i is "1" for user k, E is a vector comprising the residuals according to $E=\hat{S}_{QR}-\hat{G}_{QR}S$, $\hat{S}_{QR}$ is a received signal, $\hat{G}_{QR}$ is an estimated upper triangular channel matrix and S is a vector comprising the transmitted symbols.

A number of advantages are obtained by means of the present invention. For example better performance of soft value calculations compared with prior art. All users should experience essentially the same performance independent of the order in which they are processed.

BRIEF DESCRIPTION OF THE DRAWINGS

The present invention will now be described more in detail with reference to the appended drawings, where.

DETAILED DESCRIPTION

Figure 1:
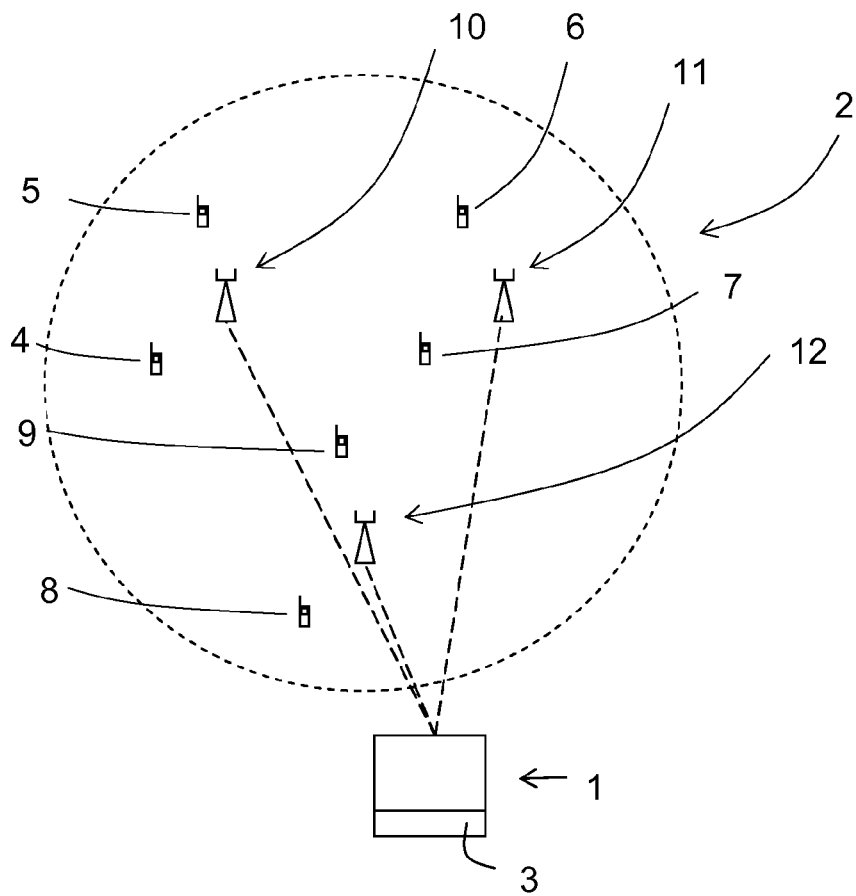
FIG. 1 shows a schematic view of a wireless communication system according to the invention.

FIG. 1 shows a node 1 in a wireless communication network 2, the node 1 comprising a receiver 3 arranged for receiving signals streams from a first user 4 and a second user 5 via a first antenna arrangement 10, a third user 6 and a fourth user 7 via a second antenna arrangement 11, and a fifth user 8 and a sixth user 9 via a third antenna arrangement 12.

Alternatively, the receiver 3 is arranged for receiving signals streams from the first user 4, the second user 5, the third user 6, the fourth user 7, the fifth user 8 and the sixth user 9 via any combination of the first antenna arrangement 10, the second antenna arrangement 11, and the third antenna arrangement 12.

Figure 2:
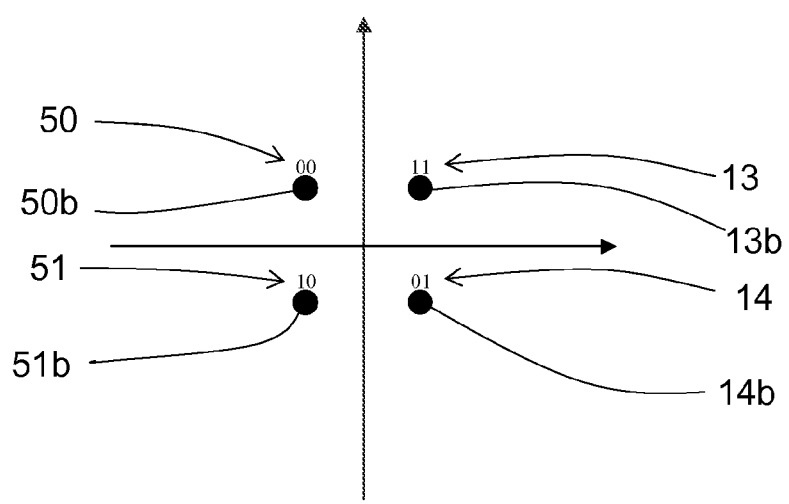
FIG. 2 shows the bit sequences and corresponding symbols for non-Gray coded QPSK.

With reference to FIG. 2, showing the symbol configuration for QPSK (Quadrature Phase Shift Modulation) (4-QAM (Quadrature Amplitude Modulation)), the signal streams comprise bit sequences, where each received bit sequence 13 constitutes one symbol 13b. The receiver 3 is arranged for evaluating which bit sequence 14 with corresponding symbol 14b that is most likely to have been received for a certain sent symbol for each user 4, 5, 6, 7, 8, 9, which will be described more in detail below.

In an MLD (Maximum Likelihood Detector) approach, all symbol candidates for all users are evaluated. Also, all possible combinations of all users' symbol candidates are also evaluated. One combination of symbols, one for each user, is called a candidate set. The number of such candidate sets is very large in MLD for higher order modulations and when the number of users is large, resulting in a large computational complexity.

Figure 3:
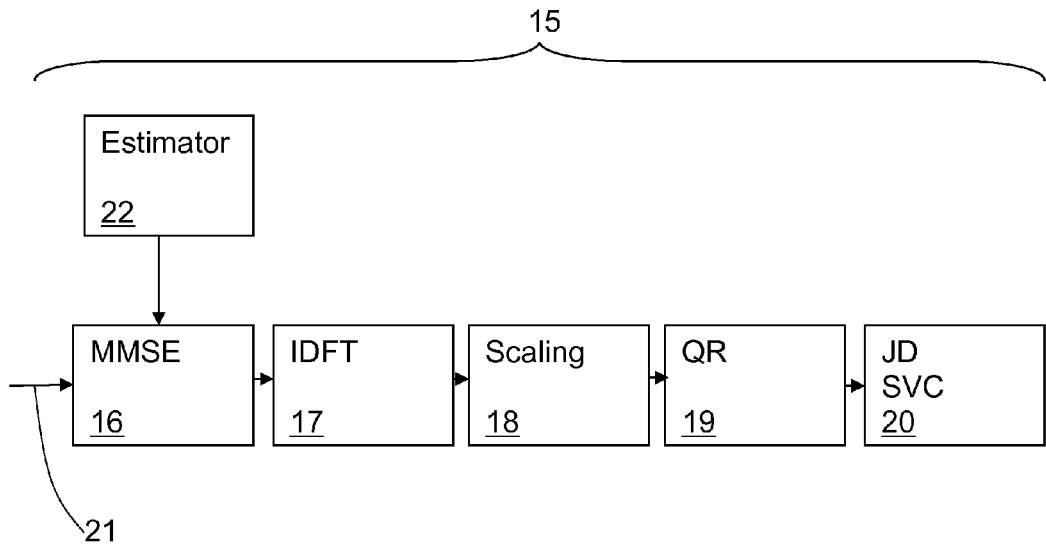
FIG. 3 schematically shows a part of the receiver.

FIG. 3 shows a demodulator 15 for SC-FDMA in the receiver 3, which demodulator 15 in a previously known manner in particular comprises means 16 for performing MMSE (minimum mean square error) equalization, means 17 for performing IDFT (inverse discrete Fourier transform), means 18 for performing scaling and means 19 for performing so-called QR factorization. The demodulator furthermore comprises means 20 for performing so-called joint detection with soft value calculations.

The means 16 for performing MMSE is arranged for minimizing the mean square error where the input is user data in the form of SC-FDMA symbols 21, furthermore input is also received from a channel and noise covariance estimator 22. The influence of reflections is minimized.

The modulated symbols transmitted on the uplink are precoded using DFT (Discrete Fourier Transform). Thus the output from the MMSE means 16 must be transformed to the time domain. Next step of the demodulator is thus the IDFT means 17 which performs this task.

A demodulator for OFDM (as used in LTE downlink) follows from FIG. 2 by excluding the IDFT 17.

Then scaling of the observed signals is done at the scaling means 18 such that the residual noise variance is unity in each of the observation signals. By means of this scaling of the observed signals, divisions are avoided in the large amount of soft value calculations.

The QR factorization and joint detection with soft value calculations will be described more in detail in the following.

The channel is represented by a matrix $\hat{H}$, which is estimated by means of reference signals such that a channel matrix estimation is obtained.

The received signals $\hat{s}$ may be written as $$\hat{s} = \hat{H} \cdot s + N, \quad (1)$$

where s denotes the transmitted signals in the form of a transmitted signal vector and N is a vector representing additive noise and interference.

In order to reduce this computational complexity, a QR factorization of the time domain channel may be calculated after the scaling such that an M-algorithm as described later on can be used. This QR factorization is calculated from the channel matrix $\hat{H}$ as $$\hat{H} = \hat{Q} \cdot \hat{R} \quad (2)$$

where $\hat{Q}$ is a matrix for which $\hat{H}^H \cdot \hat{Q} = I$, the superscript $^H$ denoting that the vector/matrix in question is Hermite transposed, i.e. it denotes that it is a transposed complex conjugate. $\hat{R}$ is a matrix that is upper triangular and I is the identity matrix.

By multiplying the received signal $\hat{s}$ with $\hat{Q}^H$, the matrix $\hat{s}_{QR}$ is obtained:

$$\hat{s}_{QR} = \hat{Q}^H \cdot \hat{s} = \hat{Q}^H (\hat{H} \cdot s + N) = \hat{Q}^H \cdot \hat{Q} \cdot \hat{R} \cdot s + \hat{Q}^H \cdot N = \hat{R} \cdot s + \hat{Q}^H \cdot N. \quad (3)$$

The terms $\hat{G}_{QR} = \hat{R}$ and $\hat{Q}^H \cdot N = N_{QR}$ are now introduced.

The QR-factorization is used such that the observation in a joint detection algorithm (e.g. MLD, Maximum Likelihood Detector) can be modeled as $$\hat{S}_{QR} = \hat{G}_{QR} S + N_{QR} = \begin{bmatrix} \hat{s}_{QR,0} \\ \hat{s}_{QR,1} \\ \vdots \\ \hat{s}_{QR,K-2} \\ \hat{s}_{QR,K-1} \end{bmatrix} =$$

$$\begin{bmatrix} \hat{g}_{QR,0,0} & \hat{g}_{QR,0,1} & \cdots & & \hat{g}_{QR,0,K-1} \\ 0 & \hat{g}_{QR,1,1} & & & \\ \vdots & & \ddots & & \vdots \\ & & & \hat{g}_{QR,K-2,K-2} & \hat{g}_{QR,K-2,K-1} \\ 0 & 0 & \cdots & 0 & \hat{g}_{QR,K-1,K-1} \end{bmatrix} \begin{bmatrix} s_0 \\ s_1 \\ \vdots \\ s_{K-2} \\ s_{K-1} \end{bmatrix} + \begin{bmatrix} N_{QR,0} \\ N_{QR,1} \\ \vdots \\ N_{QR,K-2} \\ N_{QR,K-1} \end{bmatrix}$$

(4)

where the channel matrix $\hat{G}_{QR}$ has size K×K, K being the number of users, and is upper triangular, S is a column vector with transmitted symbols, which for example are QPSK, 16QAM or 64QAM modulated, and $N_{QR}$ is additive noise and interference.

If the QR-factorization according to the above is used, the channel matrix is upper triangular. Then the MLD residuals used in the Log Likelihood Ratio (LLR) metrics equals $$E = \hat{S}_{QR} - \hat{G}_{QR} S = \begin{bmatrix} e_0 \\ e_1 \\ \vdots \\ e_{K-2} \\ e_{K-1} \end{bmatrix} = \begin{bmatrix} \hat{s}_{QR,0} \\ \hat{s}_{QR,1} \\ \vdots \\ \hat{s}_{QR,K-2} \\ \hat{s}_{QR,K-1} \end{bmatrix} -$$

(5)

$$\begin{bmatrix} \hat{g}_{QR,0,0} & \hat{g}_{QR,0,1} & \cdots & & \hat{g}_{QR,0,K-1} \\ 0 & \hat{g}_{QR,1,1} & & & \\ \vdots & & \ddots & & \vdots \\ & & & \hat{g}_{QR,K-2,K-2} & \hat{g}_{QR,K-2,K-1} \\ 0 & 0 & \cdots & 0 & \hat{g}_{QR,K-1,K-1} \end{bmatrix} \begin{bmatrix} s_0 \\ s_1 \\ \vdots \\ s_{K-2} \\ s_{K-1} \end{bmatrix}$$

In this way, the MLD residual $e_{K-1}$ depends only on the received bit sequence $\hat{s}_{QR,K-1}$ and the transmitted bit sequence $s_{K-1}(n)$ for user number K−1.

Figure 4:
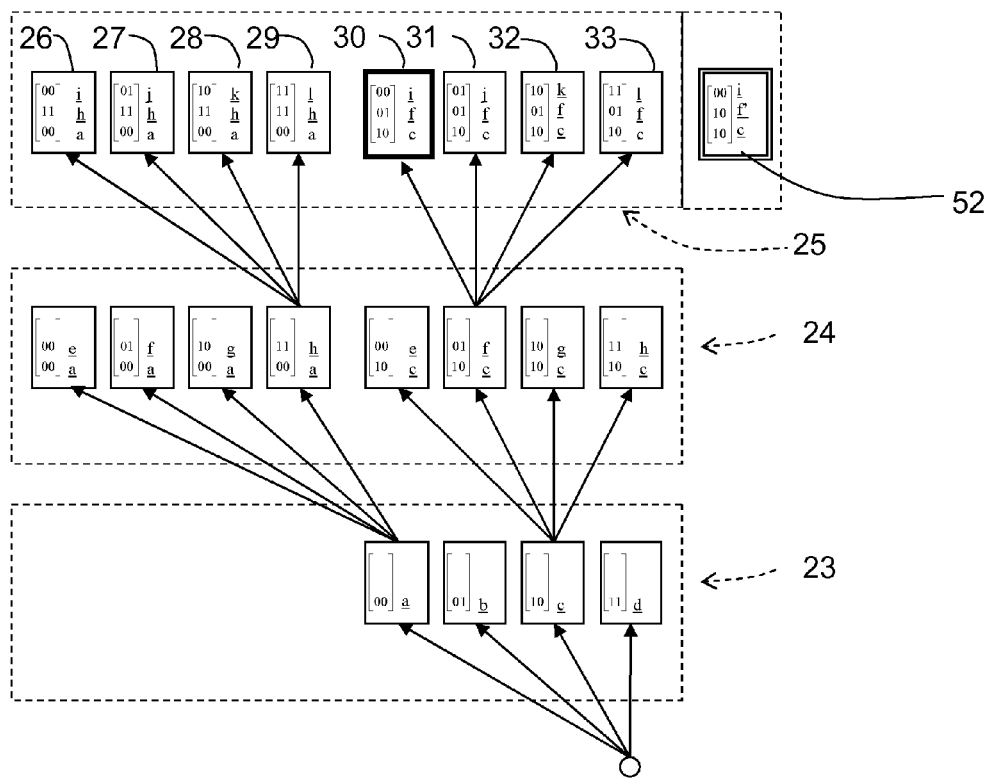
FIG. 4 schematically shows an M-algorithm for QPSK.

With reference to FIG. 4, an example of the M-algorithm for

M=2, the number of survivors of each step being 2,
QPSK and
three users, K=3
will be described.

In a first step 23 of the M-algorithm, metric values equal to the absolute square of the MLD residual are calculated for the last row only. Here, metric values are calculated for all possible candidates of $s_{K-1}(n)$, i.e. for the corresponding bit sequences "00" a, "01" b, "10" c and "11" d. This is illustrated in the first step 23. Further, the M=2 candidates of $s_{K-1}(n)$ are determined which yields the lowest metric which here corresponds to the bit sequences "00" a and "10" c. These bit sequences a, c with corresponding symbols are defined as surviving candidates. In the second step 24, one additional value of the observed signal $\hat{s}_{QR,K-2}(n)$ is used and the residuals are calculated for all possible transmitted candidates of $s_{K-2}(n)$ with the M=2 surviving candidates a, c from the previous step 23, i.e. for the corresponding bit sequences "00" e, "01" f, "10" g and "11" h. This procedure is then repeated, in the third step 25 for all possible transmitted candidates of $s_{K-3}(n)$ with the M=2 surviving candidates h, f from the previous step 24, i.e. for the corresponding bit sequences "00" i, "01" j, "10" k and "11" l.

Thus in the first step 23, the bit sequences "01" b and "11" d are discarded, and in the second step 24 the bit sequences "00" e and "10" g are discarded. The first step 23 relates to the third user, the second step 24 to the second user and the third step 25 to the first user.

In the third step, eight sets of bit sequences are acquired; a first set of bit sequences 26; i, h, a, a second set of bit sequences 27; j, h, a, a third set of bit sequences 28; k, h, a, a fourth set of bit sequences 29; l, h, a, a fifth set of bit sequences 30; i, f, c, a sixth set of bit sequences 31; j, f, c, a seventh set of bit sequences 32; k, f, c, and an eighth set of bit sequences 33; l, f, c. Each set of bit sequences constitutes a candidate of bit sequences.

In order to investigate the reliability of an estimated bit value, i.e. the probability that the estimated bit is correct, a soft value calculation is performed.

Soft values to be used in a channel decoder such as a Turbo decoder, can be calculated using squared Euclidian distances in a max-log LLR (Log Likelihood Ratio) approximation such as $$L(b_k(i) \mid \hat{S}_{QR}) = \min_{S \in S_{0,k,i}} \{\|\hat{S}_{QR} - \hat{G}_{QR}S\|^2\} - \min_{S \in S_{1,k,i}} \{\|\hat{S}_{QR} - \hat{G}_{QR}S\|^2\} \quad (6)$$

where $b_k(i)$ is bit number i for user k, and $S_{0,k,i}$ is the set of all possible transmitted symbols for which bit number i is "0" for user k. In the same manner, $S_{1,k,i}$ is the set of all possible transmitted symbols for which bit number i is "1" for user k. The squared Euclidean distance $\|\hat{S}_{QR} - \hat{G}_{QR}S\|^2$ is often referred to as the MLD metric.

The soft values can alternatively be calculated using Euclidian distances, instead of squared Euclidian distances, in the following max-log LLR approximation $$L(b_k(i) \mid \hat{S}_{QR}) = \min_{S \in S_{0,k,i}} \{\|\hat{S}_{QR} - \hat{G}_{QR}S\|\} - \min_{S \in S_{1,k,i}} \{\|\hat{S}_{QR} - \hat{G}_{QR}S\|\}. \quad (7)$$

By way of example, a soft value calculation for bit number one, the first user will be described, where the first user is related to four bit sequences i, j, k, l which are repeated once. Here the first user is the user corresponding to the first row in the matrices within the boxes containing said eight sets of bit sequences 26, 27, 28, 29, 30, 31, 32, 33 in the third step in FIG. 4. Bit number 1 is thus the first bit in the bit sequences i, j, k, l relating to the third user in the sets of bit sequences 26, 27, 28, 29, 30, 31, 32, 33 in the third step 25.

Figure 5:
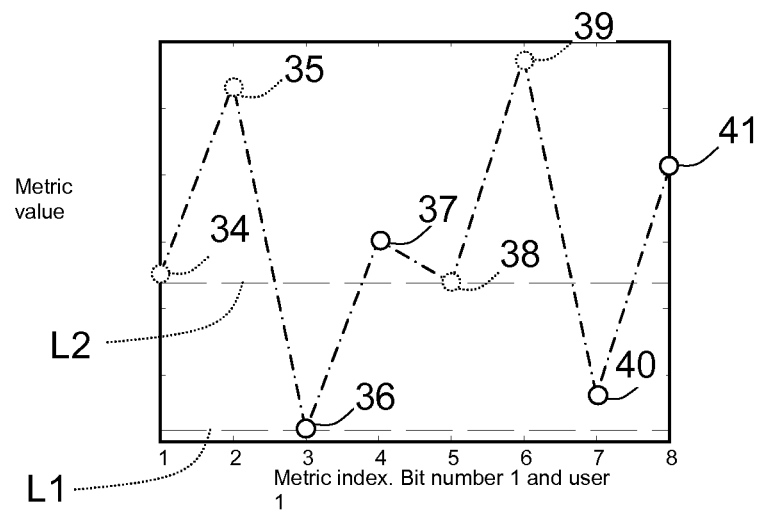
FIG. 5 shows a first set of metrics from soft value calculations.

First, the squared Euclidean distance $\|\hat{S}_{QR} - \hat{G}_{QR}S\|^2$ calculated using said eight sets of bit sequences 26, 27, 28, 29, 30, 31, 32, 33, resulting in the corresponding metrics 34, 35, 36, 37, 38, 39, 40, 41 shown in FIG. 5 where the metrics 34, 35, 38, 39 that correspond to the bit value "0" are marked with a dotted circle and the metrics 36, 37, 40, 41 that correspond to the bit value "1" are marked with a solid circle.

The metric 36 with the lowest value L1 for the bits with the value "1" is now subtracted from the metric 38 with the lowest value L2 for the bits with the value "0", which difference constitutes the soft value $L(b_k(i) \mid \hat{S}_{QR})$ according to equation (6) or (7). By using the values for bit number 1, user number 1, according to the above, there is apparently no problem to perform the soft value calculation.

Another example relates to a soft value calculation for bit number two, a second user, where the second user is related to two bit sequences h, f which each is repeated four times. Bit number 2 is thus the second bit in the bit sequences h, f relating to the second user in the sets of bit sequences 26, 27, 28, 29, 30, 31, 32, 33 in the third step.

Figure 6:
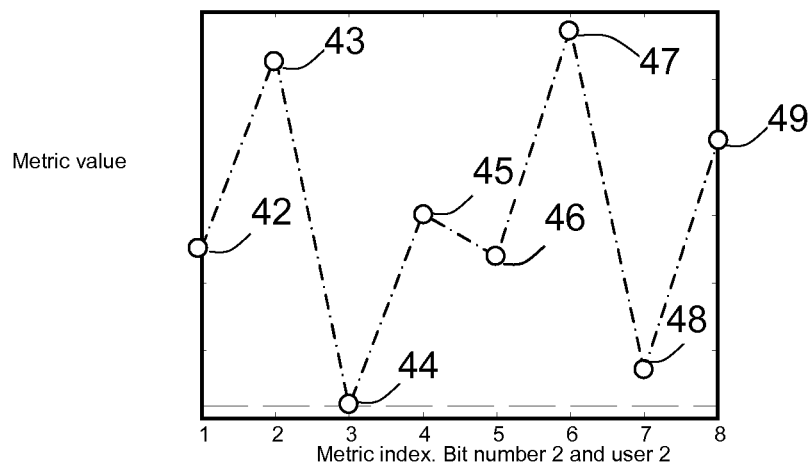
FIG. 6 shows a second set of metrics from soft value calculations.

First, the squared Euclidean distance $\|\hat{S}_{QR} - \hat{G}_{QR}S\|^2$ is calculated using said eight sets of bit sequences 26, 27, 28, 29, 30, 31, 32, 33, resulting in the corresponding metrics 42, 43, 44, 45, 46, 47, 48, 49 shown in FIG. 6. However, since there are no sets of bit sequences for the second bit of the second user with bit value "0", no soft value calculation can be performed at this stage.

There is thus a problem relating to calculation of soft value calculation when only one type of bits, with the value "1" or "0", is present, and consequently one type of bits, with the value "1" or "0", is missing, for a certain bit and a certain user.

The initial best candidate of bit sequences that is acquired from the M-algorithm, i.e. the one with the lowest calculated metrics for the received bit sequences for the users, is in this case chosen for a so-called bit-flip, which means that the bit in question is exchanged with its counterpart. In this example, the fifth set of bit sequences 30; i, f, c, a is the initial best candidate of bit sequences, which means that for bit number 2, user number 2, the bit "0" is exchanged with the bit "1". The soft value calculation for bit number 2, user number 2, is now possible, but one step remains in order to acquire the very best bit sequence in this context.

According to the present invention, the bit sequence f', 51 comprising the inserted missing bit is chosen such that it also corresponds to a symbol 51b with the shortest Euclidean distance to the symbol 14b, with corresponding bit sequence 14, that is initially is indicated to be most likely to correspond to a certain sent symbol.

Thus not necessarily only the bit which is missing is exchanged, but, depending on the Euclidian distances between the symbols corresponding to the bit sequences where at least the missing bit is flipped, and the corresponding symbol that is most likely to correspond to a certain sent symbol, other bits may be changed.

The example described above for QPSK (4-QAM) constitutes the simplest form of the present invention, and the present invention will now be described more in detail with reference to FIG. 2 and FIG. 4.

The bit sequence "01" 14, f corresponds to a first symbol 14b which initially has been determined to be the most likely to correspond to a certain sent symbol. For the soft value calculation, the bit "1" has to be changed to a bit of the value "0", which leads to the bit sequence "00" 50 which corresponds to a second symbol 50b. However, the Euclidian distance between the first symbol 14b and the second symbol 50b is not the shortest Euclidian distance between the first symbol 14b and a symbol with a corresponding bit sequence where the second bit has the value "0". Instead, the shortest Euclidian distance between the first symbol 14b and a symbol with a corresponding bit sequence where the second bit has the value "0" is found for the bit sequence "10" 51, which corresponds to a third symbol 51b. Thus, in accordance with the present invention, in order to be able to perform a soft value calculation, a metric calculation is carried out for the bit sequence "10" of the second user. In this way a new candidate of bit sequences 52; i, f', c is acquired, and thus the soft value calculation is made possible.

Figure 7:
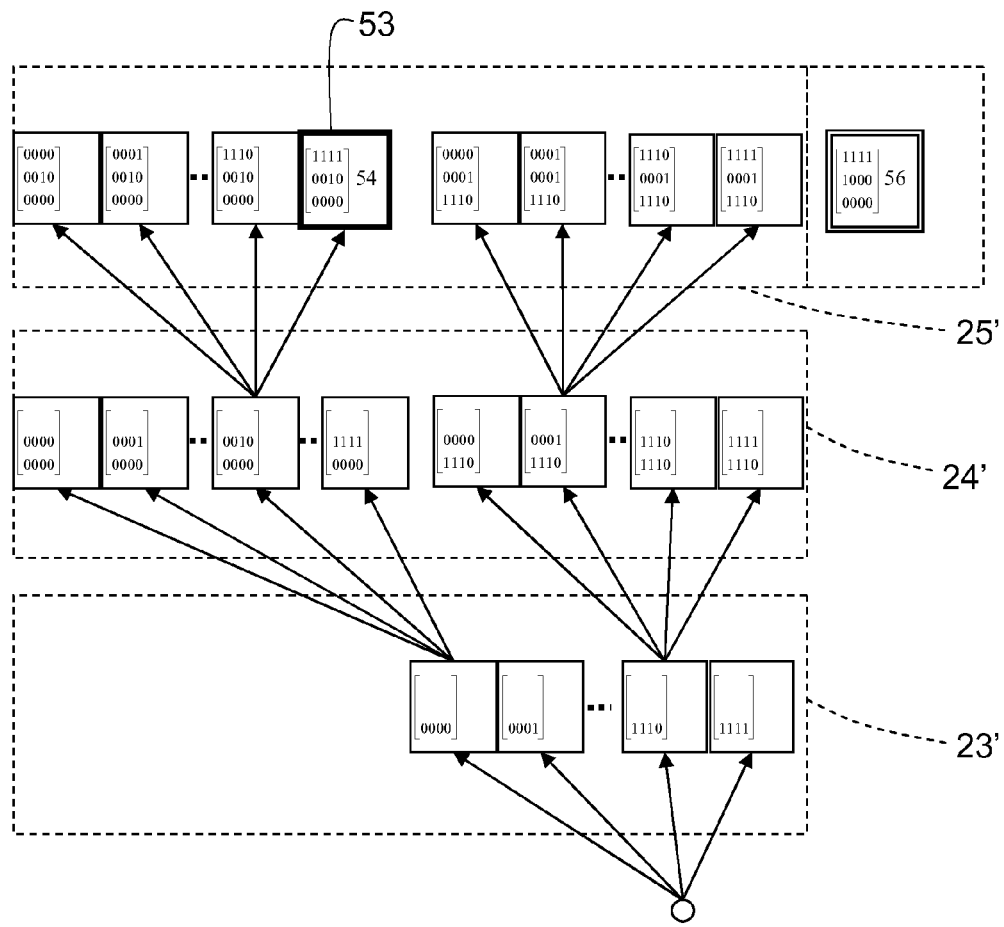
FIG. 7 schematically shows an M-algorithm for 16-QAM.

Another example will now be shown for 16-QAM. The M-algorithm is illustrated in FIG. 7, where steps 23', 24', 25', corresponding to those for QPSK, which leads to a number of candidates of bit sequences, where an initial best candidate of bit sequences 53 is determined. For the first bit, second user, the bit value is "0" for all sets of bit sequences.

Figure 8:
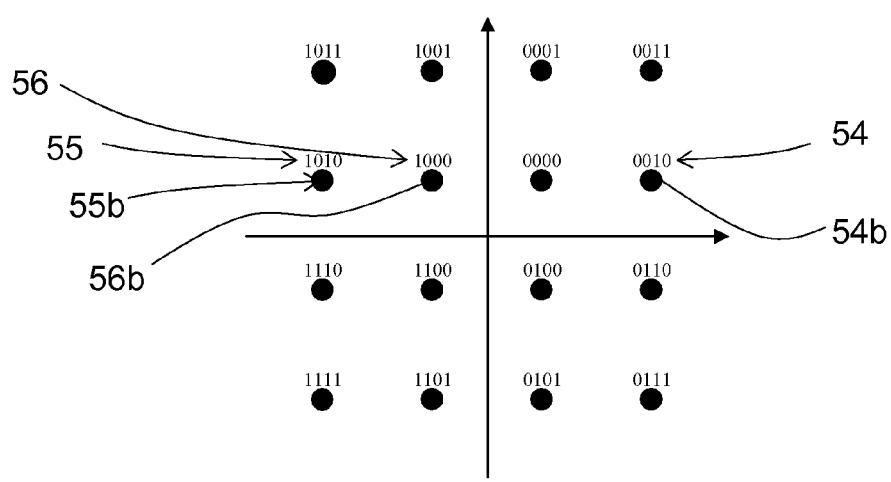
FIG. 8 shows the bit sequences and corresponding symbols for 16-QAM.

Thus, with reference also to FIG. 8, this first bit of the second user is flipped for the best candidate of bit sequences 53, where the corresponding bit sequence is "0010" 54 with a corresponding first symbol 54b. Flipping this bit, or exchanging the first "0" with a "1", leads to the bit sequence "1010" 55, but this corresponds to a second symbol 55b which is a symbol where the first bit has the value "1" which does not have the shortest Euclidian distance to the first symbol 54b. Instead, the symbol where the first bit has the value "1" with the shortest Euclidian distance to the first symbol 54b is a third symbol 56b with a corresponding bit sequence "1000" 56. Thus, in accordance with the present invention, the third symbol 56b is used.

Figure 9:
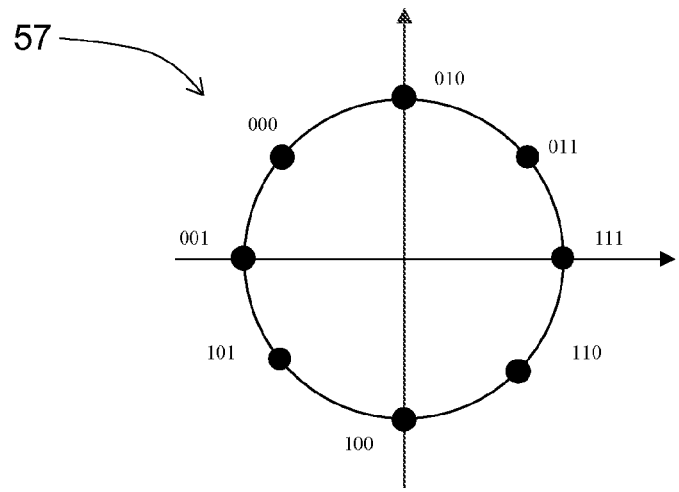
FIG. 9 shows the bit sequences and corresponding symbols for 8-PSK.

The present invention applies to all types of coding with four symbols or more, for example for 8-PSK (Phase Shift Keying) 57, se FIG. 9, or for 64-QAM (not shown).

Figure 10:
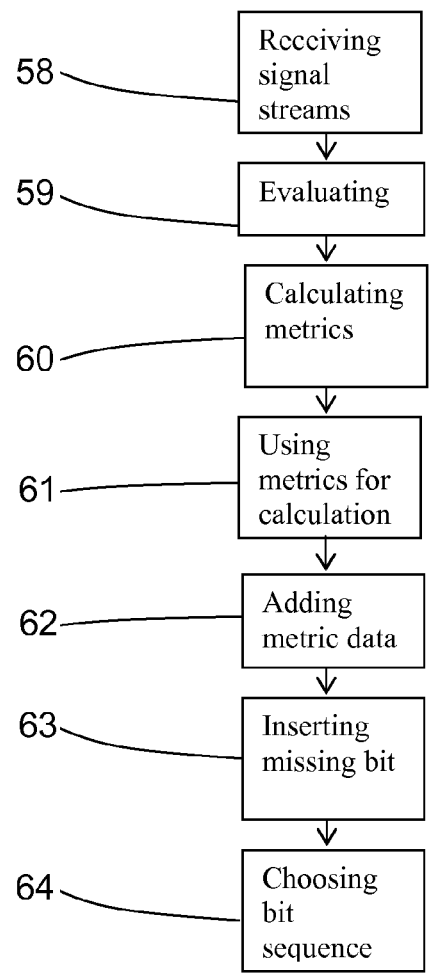
FIG. 10 shows a flowchart for a method according to the present invention.

With reference to FIG. 10, the present invention also relates to a method in a receiver 3 of a node 1 in a wireless communication network 2, comprising the steps:
58: receiving at least two signals streams from at least one user 4, 5, 6, 7, 8, 9 via at least one antenna 10, 11, 12, the signal streams comprising bit sequences, each received bit sequence 13 constituting one symbol 13b from a set of at least four symbols;
59: evaluating which bit sequence 14 that is most likely to have been received for a certain sent symbol for each signal stream by means of discarding certain possible bit sequences b, d; e, g and keeping certain possible bit sequences a, c; f, h;
60: calculating metrics 34, 35, 36, 37, 38, 39, 40, 41; 42, 43, 44, 45, 46, 47, 48, 49 indicative of which bit sequence that is most likely to correspond to a certain sent symbol for the remaining possible bit sequences a, c; f, h; i, j, k, l;
61: further using the metrics 34, 35, 36, 37, 38, 39, 40, 41; 42, 43, 44, 45, 46, 47, 48, 49 for calculation of an estimation for each received bit, which estimation is indicative of which bit that is most likely to correspond to a certain sent bit;
62: adding metric data corresponding to an added bit sequence f' for each case where the available metrics 26, 27, 28, 29, 30, 31, 32, 33 are incomplete for performing the estimation since either a bit of the value "1" or a bit of a value "0" is missing, the added bit sequence f' corresponding to the said bit sequence 14; i, f, c that initially is indicated to be most likely to correspond to a certain sent symbol;
63: inserting the missing bit in the added bit sequence in the place where it is missing; and
64: choosing the bit sequence f' comprising the inserted missing bit such that it also corresponds to a symbol 51b with the shortest Euclidian distance to the symbol 14b with the said corresponding bit sequence 14; i, f, c that initially is indicated to be most likely to correspond to a certain sent symbol.

The present invention is not limited to the embodiments described above, but may vary freely within the scope of the claims. For example, the exact type of system and modulation is not important. Where a number of users have been discussed, it may in general terms be regarded as a number of streams, not being limited to a certain number of real users. Generally, the receiver is arranged for receiving at least two signals streams from at least one user via at least one antenna.

This means that there could be a number of streams from only one user or from more than one user. In the case on only one user, it is the streams which are evaluated and not the users since there is only one user in that case.

The present invention is also applicable for transmissions from base-station to user, from user to user and from base station to base station. A node may thus be a base station as well as a user terminal.

Furthermore, the present invention not only relates to SC-FDMA but also relates to OFDM as well.

The present invention is not only applicable for LTE, but may for example also be used for GSM/EDGE (Global System for Mobile communications/Enhanced Data rates for GSM Evolution, WCDMA (Wide Code Division Multiple Access), CDMA2000 (Code Division Multiple Access 2000), WLAN (Wireless Local Area Network), WiMAX (Worldwide Interoperability for Microwave Access), and IMT-advanced (International Mobile Telecommunications-Advanced).

The invention claimed is:

1. A node in a wireless communication network, the node comprising a receiver arranged for receiving at least two signal streams from at least one user via at least one antenna, the signal streams comprising bit sequences, each received bit sequence constituting one symbol from a set of at least four symbols, the receiver further being arranged for evaluating which bit sequence that is most likely to have been received for a certain sent symbol for each signal stream by means of discarding certain possible bit sequences and keeping certain possible bit sequences, and furthermore, for the remaining possible bit sequences, being arranged for calculating metrics indicative of which bit sequence that initially is most likely to correspond to a certain sent symbol, the metrics further being used for calculation of an estimation for each received bit, which estimation is indicative of which bit that is most likely to correspond to a certain sent bit, where the receiver is arranged for addition of metric data for a certain signal stream corresponding to an added bit sequence for each case where the available metrics are incomplete for performing the estimation since either a bit of the value "1" or a bit of a value "0" is missing for said certain signal stream, the added bit sequence corresponding to the said bit sequence that initially is indicated to be most likely to correspond to a certain sent symbol, where the missing bit is inserted in the added bit sequence in the place where it is missing, wherein the bit sequence comprising the inserted missing bit further is chosen such that it also corresponds to a symbol with the shortest Euclidian distance to the symbol with the said corresponding bit sequence that initially is indicated to be most likely to correspond to a certain sent symbol.

2. The node according to claim 1, wherein the discarding of certain possible bit sequences and the keeping of certain possible bit sequences is performed in a step-wise manner with a step for each user.

3. The node according to claim 2, wherein the discarding of certain possible bit sequences and keeping of certain possible bit sequences is performed as a tree-search with an M-algorithm.

4. The node according to claim 1, wherein the metric is calculated as $|E|^2$, where E is a vector comprising the residuals according to $E=\hat{S}_{QR}-\hat{G}_{QR}S$, $\hat{S}_{QR}$ is a received signal, $\hat{G}_{QR}$ is an estimated upper triangular channel matrix and S is a vector comprising the transmitted symbols.

5. The node according to claim 1, wherein the estimation is in the form of a soft value calculation.

6. The node according to claim 5, wherein the soft value calculation is performed by means of squared Euclidian distances in a max-log LLR, Log Likelihood Ratio, approximation.

7. The node according to claim 6, wherein the soft value calculation is performed according to:

$$L(b_k(i)|\hat{S}_{QR}) = \min_{S \in S_{0,k,i}} \{\|\hat{S}_{QR} - \hat{G}_{QR}S\|^2\} - \min_{S \in S_{1,k,i}} \{\|\hat{S}_{QR} - \hat{G}_{QR}S\|^2\}$$

where $b_k(i)$ is bit number i for user k, and $S_{0,k,i}$ is the set of all possible transmitted symbols for which bit number i is "0" for user k. In the same manner, $S_{1,k,i}$ is the set of all possible transmitted symbols for which bit number i is "1" for user k, E is a vector comprising the residuals according to $E=\hat{S}_{QR}-\hat{G}_{QR}S$, $\hat{S}_{QR}$ is a received signal, $\hat{G}_{QR}$ is an estimated upper triangular channel matrix and S is a vector comprising the transmitted symbols.

8. The node according to claim 5, wherein the soft value calculation is performed by means of Euclidian distances in a max-log LLR, Log Likelihood Ratio, approximation.

9. The node according to claim 8, wherein the soft value calculation is performed according to:

$$L(b_k(i)|\hat{S}_{QR}) = \min_{S \in S_{0,k,i}} \{\|\hat{S}_{QR} - \hat{G}_{QR}S\|\} - \min_{S \in S_{1,k,i}} \{\|\hat{S}_{QR} - \hat{G}_{QR}S\|\}$$

where $b_k(i)$ is bit number i for user k, and $S_{0,k,i}$ is the set of all possible transmitted symbols for which bit number i is "0" for user k. In the same manner, $S_{1,k,i}$ is the set of all possible transmitted symbols for which bit number i is "1" for user k, E is a vector comprising the residuals according to $E=\hat{S}_{QR}-\hat{G}_{QR}S$, $\hat{S}_{QR}$ is a received signal, $\hat{G}_{QR}$ is an estimated upper triangular channel matrix and S is a vector comprising the transmitted symbols.

10. A method in a receiver of a node in a wireless communication network, comprising the steps:
   receiving at least two signals streams from at least one user via at least one antenna, the signal streams comprising bit sequences, each received bit sequence constituting one symbol from a set of at least four symbols;
   evaluating which bit sequence that is most likely to have been received for a certain sent symbol for each signal stream by means of discarding certain possible bit sequences and keeping certain possible bit sequences;
   calculating metrics indicative of which bit sequence that initially is most likely to correspond to a certain sent symbol for the remaining possible bit sequences;
   further using the metrics for calculation of an estimation for each received bit, which estimation is indicative of which bit that is most likely to correspond to a certain sent bit;
   adding metric data corresponding to an added bit sequence for each case where the available metrics are incomplete for performing the estimation since either a bit of the value "1" or a bit of a value "0" is missing, the added bit sequence corresponding to the said bit sequence that initially is indicated to be most likely to correspond to a certain sent symbol;
   inserting the missing bit in the added bit sequence in the place where it is missing; and
   choosing the bit sequence comprising the inserted missing bit such that it also corresponds to a symbol with the shortest Euclidian distance to the symbol with the said corresponding bit sequence that initially is indicated to be most likely to correspond to a certain sent symbol.

11. The method according to claim 10, wherein the discarding of certain possible bit sequences and keeping of certain possible bit sequences is performed in a step-wise manner with a step for each user.

12. The method according to claim 11, wherein the discarding of certain possible bit sequences and keeping of certain possible bit sequences is performed as a tree-search using an M-algorithm.

13. The method according to claim 10, wherein the metric is calculated as $|E|^2$, where E is a vector comprising the residuals according to $E=\hat{S}_{QR}-\hat{G}_{QR}S$, $\hat{S}_{QR}$ is a received signal, $\hat{G}_{QR}$ is an estimated upper triangular channel matrix and S is a vector comprising the transmitted symbols.

14. The method according to claim 10, wherein the estimation is in the form of a soft value calculation.

15. The method according to claim 14, wherein the soft value calculation is performed by means of squared Euclidian distances in a max-log LLR, Log Likelihood Ratio, approximation.

16. The method according to claim 15, wherein the soft value calculation is performed according to:

$$L(b_k(i)|\hat{S}_{QR}) = \min_{S \in S_{0,k,i}}\{\|\hat{S}_{QR}-\hat{G}_{QR}S\|^2\} - \min_{S \in S_{1,k,i}}\{\|\hat{S}_{QR}-\hat{G}_{QR}S\|^2\}$$

where $b_k(i)$ is bit number i for user k, and $S_{0,k,i}$ is the set of all possible transmitted symbols for which bit number i is "0" for user k. In the same manner, $S_{1,k,i}$ is the set of all possible transmitted symbols for which bit number i is "1" for user k, E is a vector comprising the residuals according to $E=\hat{S}_{QR}-\hat{G}_{QR}S$, $\hat{S}_{QR}$ is a received signal, $\hat{G}_{QR}$ is an estimated upper triangular channel matrix and S is a vector comprising the transmitted symbols.

17. The method according to claim 14, wherein the soft value calculation is performed by means of Euclidian distances in a max-log LLR, Log Likelihood Ratio, approximation.

18. The method according to claim 17, wherein the soft value calculation is performed according to:

$$L(b_k(i)|\hat{S}_{QR}) = \min_{S \in S_{0,k,i}}\{\|\hat{S}_{QR}-\hat{G}_{QR}S\|\} - \min_{S \in S_{1,k,i}}\{\|\hat{S}_{QR}-\hat{G}_{QR}S\|\}$$

where $b_k(i)$ is bit number i for user k, and $S_{0,k,i}$ is the set of all possible transmitted symbols for which bit number i is "0" for user k. In the same manner, $S_{1,k,i}$ is the set of all possible transmitted symbols for which bit number i is "1" for user k, E is a vector comprising the residuals according to $E=\hat{S}_{QR}-\hat{G}_{QR}S$, $\hat{S}_{QR}$ is a received signal, $\hat{G}_{QR}$ is an estimated upper triangular channel matrix and S is a vector comprising the transmitted symbols.

* * * * *

UNITED STATES PATENT AND TRADEMARK OFFICE
CERTIFICATE OF CORRECTION

PATENT NO. : 8,705,668 B2
APPLICATION NO. : 13/497552
DATED : April 22, 2014
INVENTOR(S) : Sahlin It is certified that error appears in the above-identified patent and that said Letters Patent is hereby corrected as shown below:

In the Specification

In Column 5, Line 13, delete "signals" and insert -- signal --, therefor.

In Column 5, Line 25, delete " $\hat{H}^H \cdot \hat{Q}=1$," and insert -- $\hat{Q}^H \cdot \hat{Q} = I$, --, therefor.

Signed and Sealed this
Ninth Day of September, 2014

Michelle K. Lee
*Deputy Director of the United States Patent and Trademark Office*